United States Patent [19]

Gutsche

[11] Patent Number: 4,817,550
[45] Date of Patent: Apr. 4, 1989

[54] STABILIZING SYSTEM FOR VEHICLES AND METHOD FOR USING SAME

[76] Inventor: Gunter E. Gutsche, 4476 Forget, Terrebonne, Quebec, Canada, J6X 1Z4

[21] Appl. No.: 146,102

[22] Filed: Jan. 20, 1988

[51] Int. Cl.$^4$ .............................................. B63B 39/02
[52] U.S. Cl. .................................... 414/124; 114/126; 114/143; 280/758
[58] Field of Search ................. 114/39.1, 43, 124, 126, 114/133, 135–137, 143; 280/210, 758, 755; 180/294

[56] References Cited

U.S. PATENT DOCUMENTS

| 369,175 | 8/1887 | Gaughen | 114/143 |
|---|---|---|---|
| 492,022 | 2/1893 | Jessup | 114/126 |
| 713,830 | 11/1902 | York | 114/126 |
| 2,238,464 | 4/1941 | Fletcher | 114/283 |
| 2,553,372 | 5/1951 | Hurst | 114/143 |
| 2,582,628 | 1/1952 | Halloran | 280/758 |
| 3,324,815 | 6/1967 | Morales | 114/143 |
| 3,670,834 | 6/1972 | Rogers | 180/41 |
| 3,903,827 | 9/1975 | Marcil | 114/143 |
| 3,934,535 | 1/1976 | Culver | 114/124 |
| 3,972,300 | 8/1976 | Adamski | 114/39 |
| 3,985,106 | 10/1976 | Ross | 114/91 |
| 4,044,703 | 8/1977 | Kurtz | 114/143 |
| 4,094,263 | 6/1978 | Marcil | 114/91 |
| 4,345,535 | 8/1982 | Ross | 114/122 |
| 4,352,335 | 10/1982 | Sugden | 114/143 |
| 4,377,124 | 3/1983 | Guigan | 114/128 |
| 4,378,748 | 4/1983 | Kurtz | 114/141 |
| 4,453,484 | 6/1984 | Englund | 114/143 |
| 4,638,755 | 1/1987 | Butka | 114/91 |
| 4,686,922 | 8/1987 | Burroughs | 114/143 X |

FOREIGN PATENT DOCUMENTS

| 75190 | 3/1902 | Canada . |
| 76365 | 6/1902 | Canada . |
| 286827 | 1/1929 | Canada . |

Primary Examiner—Sherman D. Basinger

[57] ABSTRACT

A stabilizing system for vehicles such as sailing craft, ice craft or racing cars that are periodically subject to lateral forces that tend to heel or roll such vehicles, the stabilizing system having a ballasted member laterally movable and positionable by non binding locking mechanism, the method to use the stabilizing system providing the ballasted member to be moved only by forces present in the environment such as wind or wave energy, centrifugal, gravity and inertia forces, the method allowing surface vehicles to execute turns with their weight more evenly distributed among their wheels or runners and allowing sailing vessels to sail with windward heel and reduced resistance and better balance.

20 Claims, 7 Drawing Sheets

DIRECTION OF TURN →

FIGURE 5
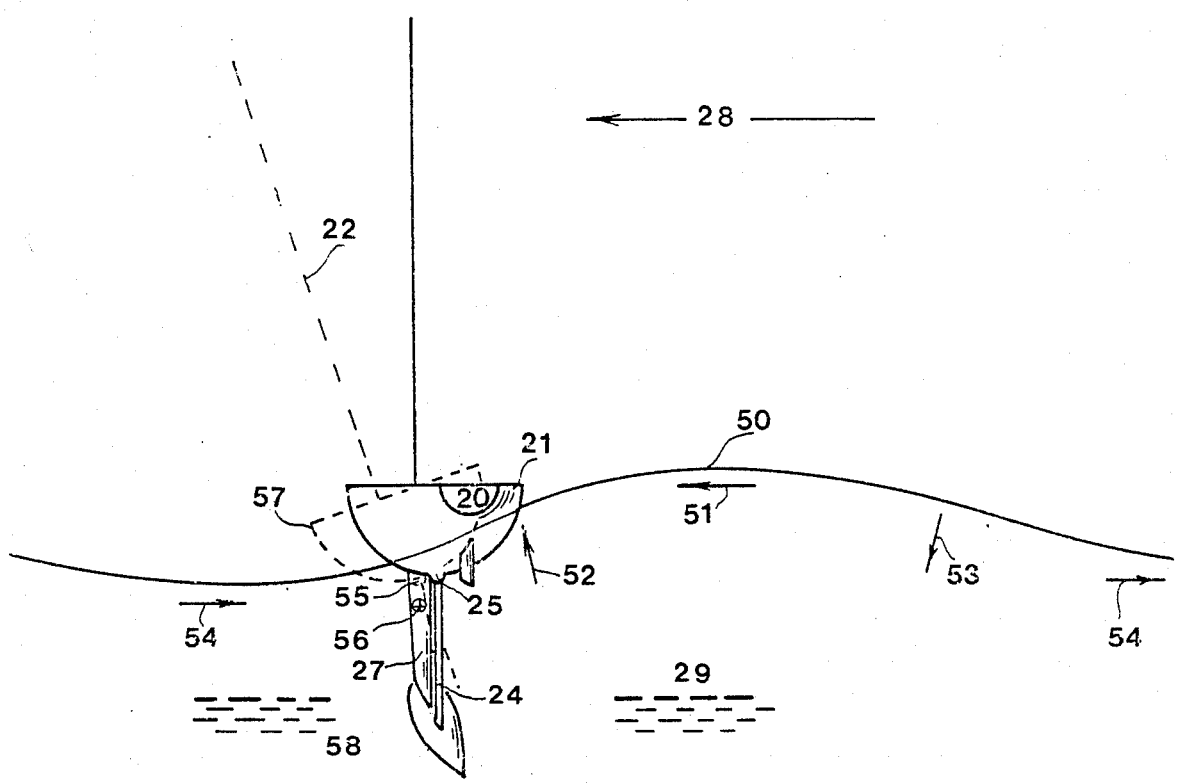
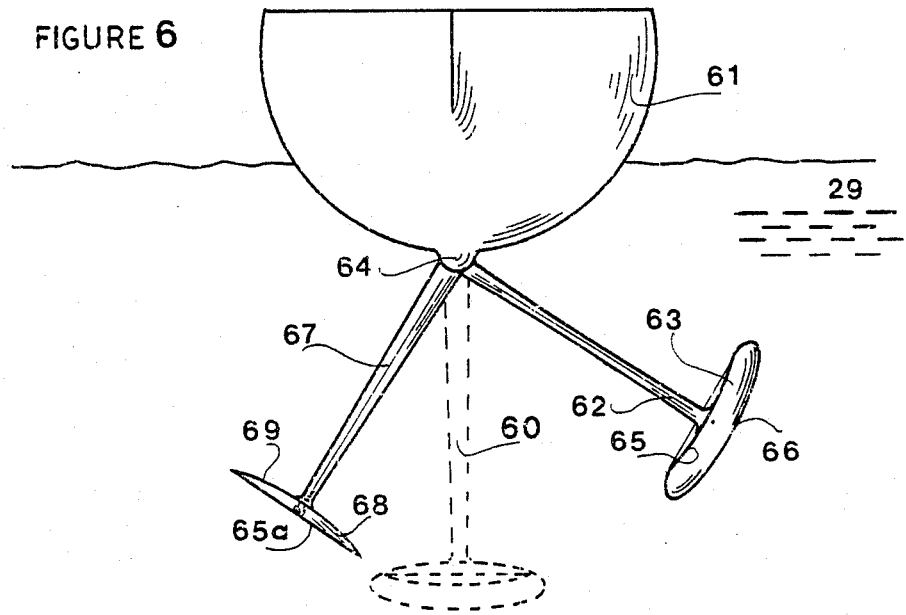
FIGURE 6

STABILIZING SYSTEM FOR VEHICLES AND METHOD FOR USING SAME

BACKGROUND OF THE INVENTION

1. Field of the Invention

The present invention relates to stabilization systems for vehicles such as sailing vessels, ice vehicles or racing cars and a method to use the same and more particularly to stabilization systems against heeling or rolling forces imposed on such vehicles.

2. Description of the Prior Art

In the use of vehicles that are subjected to lateral forces there occur undesirable side effects on the performance of these vehicles resulting from these lateral forces. Among the factors impeding the performance of sailing craft are the leeward heel with its well-known loss of sail power and the loss of control due to weather helm or the lateral force generated by the mast and sail assembly and the leeward drift of the hull during reach or tacking maneuvers. A further aspect of the conventional displacement hull sailing craft is the induced drag resulting from the windward inclination of the keel or center board when pressed to leeward in the water by the wind. Similarly another natural force, the centrifugal force created in a turn of cars and ice vehicles has the result of lifting the runners or tires in the inside of the turn and also put undue stress on the runners or tires at the outside of the turn, resulting in poor performance of surface vehicles.

Some of the prior art has attempted to hold the hull of ships on an even keel while allowing the keel and mast to pivot under the wind force. As only one such example might be cited the sailing craft of Adamski in U.S. Pat. No. 3,972,300.

A number of prior art devices use a variety of pairs of symmetrical keels moved by various mechanical means to control the heeling of their hulls. The U.S. Pat. No. 4,044,703 to Kurtz is here mentioned as a representative example.

The difficulty of maintaining a displacement hull upright in the beached condition without bracing to the ground is solved by the movable, V-shaped symmetrical keel described in the U.S. Pat. No. 4,352,335 to Sugden. This apparatus, like the previously cited examples can reduce to a limited degree the heeling of the hull under wind force.

A number of designs have as purpose to reduce the leeward travel of the hull under wind pressure by giving the keel or center board a changed hydrofoil shape and/or a changed angle of attack in the water. As only one example of such endeavors can be named the U.S. Pat. No. 4,377,124 to Guigan.

A way to present a surface that resists leeward movement of a hull is shown in the pivoting keel disclosed by York in U.S. Pat. No. 713,830.

Among the weight shifting devices to dampen the oscillations of water craft is here cited as example the U.S. Pat. No. 3,934,535 to Culver.

In the U.S. Pat. No. 3,670,834 to Rogers is shown a hillside tractor with power operated weight transfer assembly.

The above mentioned aspects of the prior art singly or combined cannot achieve the condition of a displacement sailing craft or the roll resistant surface vehicles as embodied in the present invention.

For a sail to derive maximum drive from the wind striking it substantially sideways as in a reach, airflow should be maintained over it that eliminates spill of the wind from the tip of the sail and spanwise flow away from the hull. This is done in the present invention by giving the mast windward heel. This condition can only be achieved by efficient use of the weight shifting aspect of the keel assembly while maintaining first rate antilee drift or antiskid capacity.

The Adamski device does not allow the heel of the mast to be reduced without also reducing the antilee drift or antiskid capacity of the keel. The divided but symmetrical keels of Kurtz and Sudgen share the disadvantage that the half keel that is poised to give best leeward antidrift control is not contributing to, but is, by its leeward position even cancelling some of the antiheeling forces generated by the windward half-keel. This arrangement means that the keel assembly is inefficient in that it carries excess weight and unduly increases the required wetted area of the sailing craft.

Most importantly, tests have shown that the viscosity of water greatly impedes the swing of keels of this design. The ballasted member of the present invention was found to be at least seven times more efficient in lateral travel and heights gained than the dual-purpose keels of the Adamski, Kurtz or Sudgen devices.

The disadvantage of any device of the type exemplified by the Guigan center board is the fact that the benefit derived from lessened leeway of the hull is cancelled out by the increased heel created by an asymmetrical profile or a positive windward angle of attack of the keel in the water.

The loads on the mast and keel assemblies of sailing craft under way are massive and normally quite beyond the power of the crew to overcome quickly. Many of the cited devices require the crew to manipulate keels and masts by mechanical means such as winches and hydraulics. Particularly in competition or emergency situations this has proven to be infeasible.

By contrast the present invention provides a stabilization system for sailing craft that has the capacity to sail in a reach with the mast heeling to windward, the crew using the force of gravity, inertia, centrifugal force or wave energy to position the ballasted member and the force of the wind on the sail to lift the ballasted keel or member into its raised position.

The disclosed method is made possible by having a separate ballasted member or keel with a minimal lateral surface swingably suspended below the hull. The crew is providing power only for locking the weighted member in selected positions to windward and elevated from the perpendicular on the hull. A separate antiskid member or center board is provided to counter leeward drift. Synergistic benefits from the windward heel are: dynamic pressure from the asymmetric shape of the submerged portion of the hull, eliminated induced drag in the water and elimination of the effect of weather helm. The greater stability offered by the positionable keel allows reduction of the beam of the hull, giving it diminished form drag. Alternately the advantages of the present invention can allow a designer to reduce the sail area, or the mass of the ballast without reducing speed.

On ice craft and racing cars the centrifugal force generated in turns on unbanked surfaces or the wind force in the case of wind sailers has the tendency not only to roll or tip such vehicles but also to reduce the adhesion of some of the tires or runners on the respective surfaces. The effect is additionally to unduly increase the pressure on other tires or runners causing them to be loaded beyond their capacity to transfer loads to the medium over which the vehicle is travelling. The disclosed weight shifting stabilizing system actuated by natural forces allows such vehicles to equalize the loads of different tires or runners, giving previously lightly loaded tires or runners more road or ice adhesion and reducing the loading of other tires or runners that previously skidded or deformed because of overloading. Synergistically the weight shifting stabilizing system effectively shifts the center of all forces on the vehicle subject to lateral external forces in the direction of these forces, reducing the tendency of these vehicles to roll, tip or heel.

3. Summary of the Invention

It is accordingly the object of the present invention to provide vehicles that have superior performance when subjected to a lateral force that has a tendency to tip, roll or heel them in the direction of such force.

Another object of the present invention is to provide a sailing craft and a method for using the same that allows sailing with a mast heeling to windward and a keel or center board inclined to leeward.

Another object of the invention is to provide a sailing craft that derives maximum speed from a given wind energy by having less induced drag in the air and in the water.

Another objective of the present invention is to provide a sailing craft that generates dynamic windward pressure on its submerged portion without increasing the leeward heeling forces acting on the craft.

Another objective of the invention is to change the effect of weather helm which has the tendency to diminish the windward performance of a boat to lee helm which has the effect of increasing the windward performance of a boat.

Another objective of the invention is to provide a weight shifting keel with a minimal lateral surface that allows the crew to swing it solely by gravity and inertia or centrifugal forces past the perpendicular and lock it there in selected positions to give maximum windward heel.

Another object of the invention is to provide a sailing craft that has good windward performance by reducing the amount of sail, beam or ballast required and reducing the wetted area to a minimum.

Another object of the invention is to provide a vehicle with an improved cornering ability.

Another object of the present invention is to overcome the disadvantages of the prior art sailing craft and surface vehicles.

The objects of the present invention are accomplished by the following embodiments, methods and steps.

In one aspect of the present invention there is provided a stabilizing system for a sailing craft having one streamlined ballasted member with a small lateral surface movable but lockable suspended beneath the hull to resist heeling forces and a second streamlined member or center board with a large lateral surface and little mass disposed beneath the hull to counteract lateral or leeward forces.

In a further aspect of the present invention the ballasted pivotable member is linked to a pivotable center board with a large lateral surface by a linkage that allows energy from the ballasted member to be transferred to the center board to pivot it to leeward when the ballasted member is pivoted to windward.

In another aspect of the invention both pivotable members have streamlined bodies at their tips that compliment each others shape when aligned together but generate windward dynamic pressure on convex surfaces that are exposed in the water to windward when the ballasted member is swung to windward and the light member is swung to leeward.

In a further aspect of the invention there is provided a stabilizing system with a ballasted member that swings about a vertical axis of rotation to provide weight shift to windward on a sailing craft.

In another aspect of the invention there is provided an energy storing power assistance means to assist the movement of the ballasted member and/or the functioning of the mechanism to selectively lock the ballasted member in various positions with respect to the hull.

In a further aspect of the invention there is provided a surface vehicle with a stabilizing system that provides weight shifting stabilization against rolling or tipping forces by using natural forces to laterally move the propulsion unit and/or the crew seating, thereby also contributing to equalize the loads on the tires or runners of the vehicle.

In a further aspect of the invention a method is provided to use the stabilizing system with a movable ballasted member on a vehicle, the method using a lateral natural force such as wind energy or centrifugal forces to shift the ballasted member, then locking it in a selected position with the body of the vehicle and completing a turn so as to change the exposure of the vehicle to the external lateral force so that the ballasted member now is positioned toward the direction of the lateral force with respect to the vehicle.

In a further aspect of the invention there is provided a method to use the stabilizing systems defined above, that method comprising the steps of: releasing the locking means prior to completing a turn of the sailing craft and causing the ballasted member to swing past the perpendicular and causing simultaneously the mast to heel leeward, then locking the ballasted member and the hull in a selected position, completing the turn of the sailing craft in order to change the exposure of the sailing craft to the direction of the lateral external force, which will bring the ballasted member to face the windward side so that even when exposed to the wind the mast will heel to windward, thereby causing at least four beneficial synergistic effects:

(a) causing the hull to generate dynamic pressure to windward, (b) maximizing propulsion force on the sail because of elimination of wind spill and induced drag on the sail (c) causing the keel or antiskid member to work with maximum efficiency by eliminating the tip vortex and reducing the induced drag in the water and (d) changing the deleterious effect of weather helm namely decreased windward performance, rudder braking etc., to the beneficial effects of lee helm.

In another aspect of the invention the disclosed method includes the use of centrifugal forces to move the ballasted member laterally outward in a turn prior to reversing the direction of the turn.

In another aspect of the invention the method is carried out by letting the ballasted member that has swung to a high position on the hull and is held there by the wind force fall past the perpendicular so as to have it carried by gravity and inertia to a further high position. The wind force will simultaneously heel the hull leeward and when locking the hull and the ballasted member together the combined effects of these movements will provide a higher position of the ballasted member on the windward side of the hull.

In another aspect of the invention the disclosed method is carried out by using the wave energy to move the hull into selected positions while the force of gravity holds the ballasted member substantially perpendicular.

In another aspect of the invention the disclosed method is practiced with a stabilization system that has two pivotable streamlined members: one ballasted to counteract heeling, the second lighter and larger, to counteract leeward drift and the method includes the step of using energy from the swing of the ballasted member to leeward to move the second lighter member or center board into a windward inclination by means of suitable connecting linkage.

In another aspect of the invention the method includes the step of generating windward dynamic forces on a sailing craft by the positioning of convex surfaces to windward on streamlined bodies or endplates at the tip of two opposingly swingable members of a stabilization system.

In another aspect of the invention the method is carried out by the use of a ballasted member that pivots substantially horizontally to shift weight to windward on a sailing craft sailing on a reach.

In another aspect of the invention the method includes the use of an energy storing means to assist in the initial movement and/or working of the locking mechanism of the stabilization system, the method including storing energy obtained from the kinetic energy of the swinging ballasted member.

In a further aspect of the invention there is provided a method that includes the step of using the centrifugal force present during a turn of a surface vehicle to laterally move a ballast to counteract the effect of wind forces or of centrifugal forces in a further turn in the opposite direction.

Further aspects and advantages of the invention will be evident in the following description.

BRIEF DESCRIPTION OF THE DRAWINGS

The present invention is illustrated by way of example in the following drawings wherein:

FIG. 5 is a rear view of a vessel exposed to a wave;

FIG. 6 is a front view of a stabilization system with end plates on its keels;

DESCRIPTION OF THE PREFERRED EMBODIMENTS

Referring now in detail to the drawings.

Figure 1:
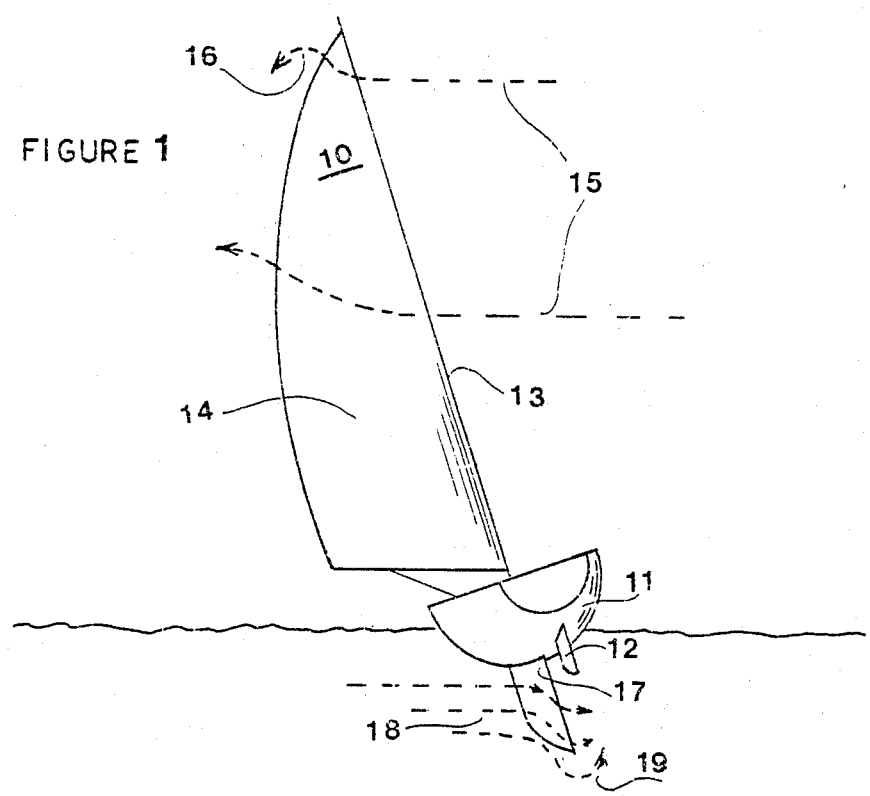
FIG. 1 is a perspective view of a conventional sailing craft.

FIG. 1 illustrates diagrammatically the fluid flow patterns on conventional sailing craft 10. The hull 11 has rudder 12 and mast 13 with main sail 14. Phantom lines 15 indicate the flow pattern of the wind on the heeling mast 13 and sail 14. The tip vortice 16 and the spanwise flow and spillage of the wind 15 are greatly increased because of the conventional heeling. Similarly, but in the opposite direction the keel 17 is seen in its windward inclination caused by the fluid pressure of wind 15. This wind pressure generates a static pressure against the lee side of the hull 11 and causes the flow pattern of the medium water 18 on keel 17. This spanwise water flow away from the hull 11 is one of the factors contributing to the observed tip vortex 19 which causes induced drag for sailing craft 10 as it tacks to windward.

Figure 2:
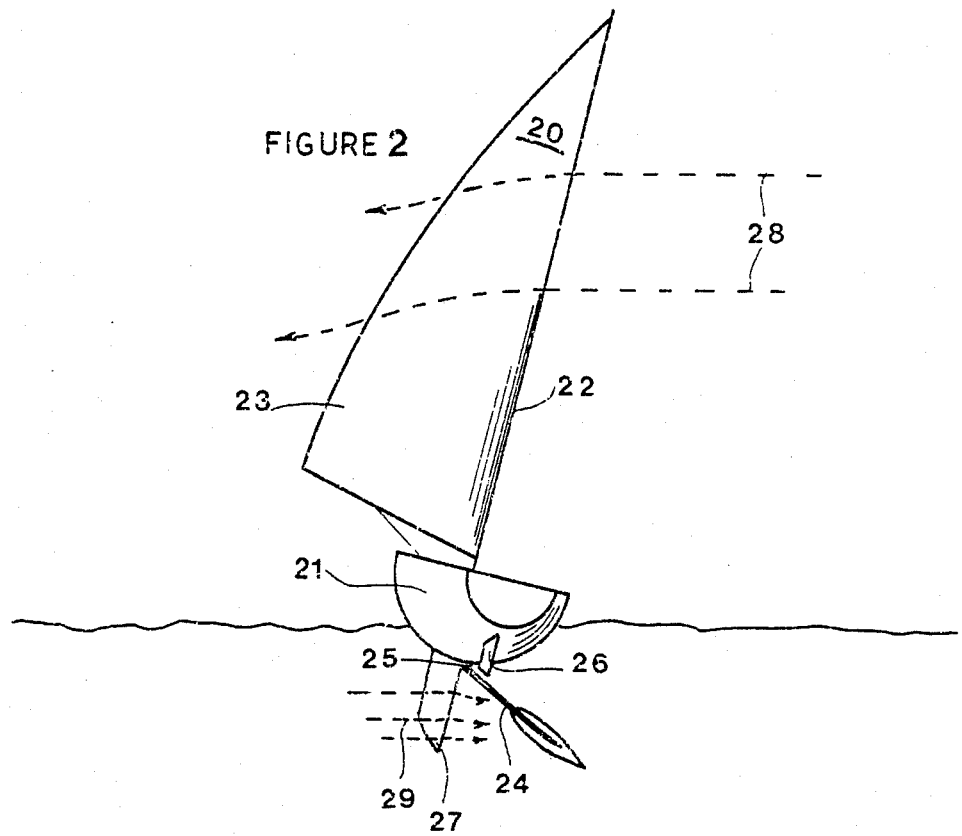
FIG. 2 is a perspective view of a sailing craft according to the present invention.

FIG. 2 illustrates the fluid flow patterns on vehicle or vessel 20 with a stabilizing system in accordance with the present invention sailing in similar wind conditions. Hull 21, mast 22 and mainsail 23 are indicated to heel against the lateral force of wind 28 under the force of gravity on ballasted member 24 that has been swung and raised up from the perpendicular to windward of hull 21. Ballasted member 24 is held in this selected position by a locking means (not shown) situated near suspension point or pivot 25. Steering means or rudder 26 is seen inclined to leeward. The antiskid member or center board 27 is also seen to tilt to leeward. Static pressure on sail 23 generated by wind 28 contributes to a spanwise air flow toward the hull 21, reducing or eliminating spillage of wind 28 or the conventional tip vortex. In an analogue situation in the water 29, leeward pressure of hull 21 against the water 29 caused by wind 28 forces medium or water 29 touching center board 27 into a flow with a spanwise component toward hull 21. This flow increases the lateral efficiency of keel 27 to resist leeward drift or skid caused by the lateral external force of the wind 28 that acts substantially normal to the length of hull 21. This spanwise flow component also eliminates the conventional tip vortex and hence the induced drag of vessel 20 in water 29. It is understood that the spanwise fluid flows on sail 23 and center board 27 directed toward the hull are components of the overall fluid flow generated by the wind 28 and the movement of craft 20 relative to the wind 28 and water 29. The designers and crew would use indicators such as streamers (not shown) attached to sail 23 or keel 27 to obtain and maintain the best angle of windward heel to derive the greatest efficiency from sail 23 and keel 27. The angle of windward heel of vessel 20 is regulated by the degree of windward swing of ballasted member 24. A small degree of windward heel will result in a corresponding reduction of the spanwise wind flow away from the hull on the sail 23 and a reduction of the spanwise water flow away from the hull on the center board 27.

Figure 3:
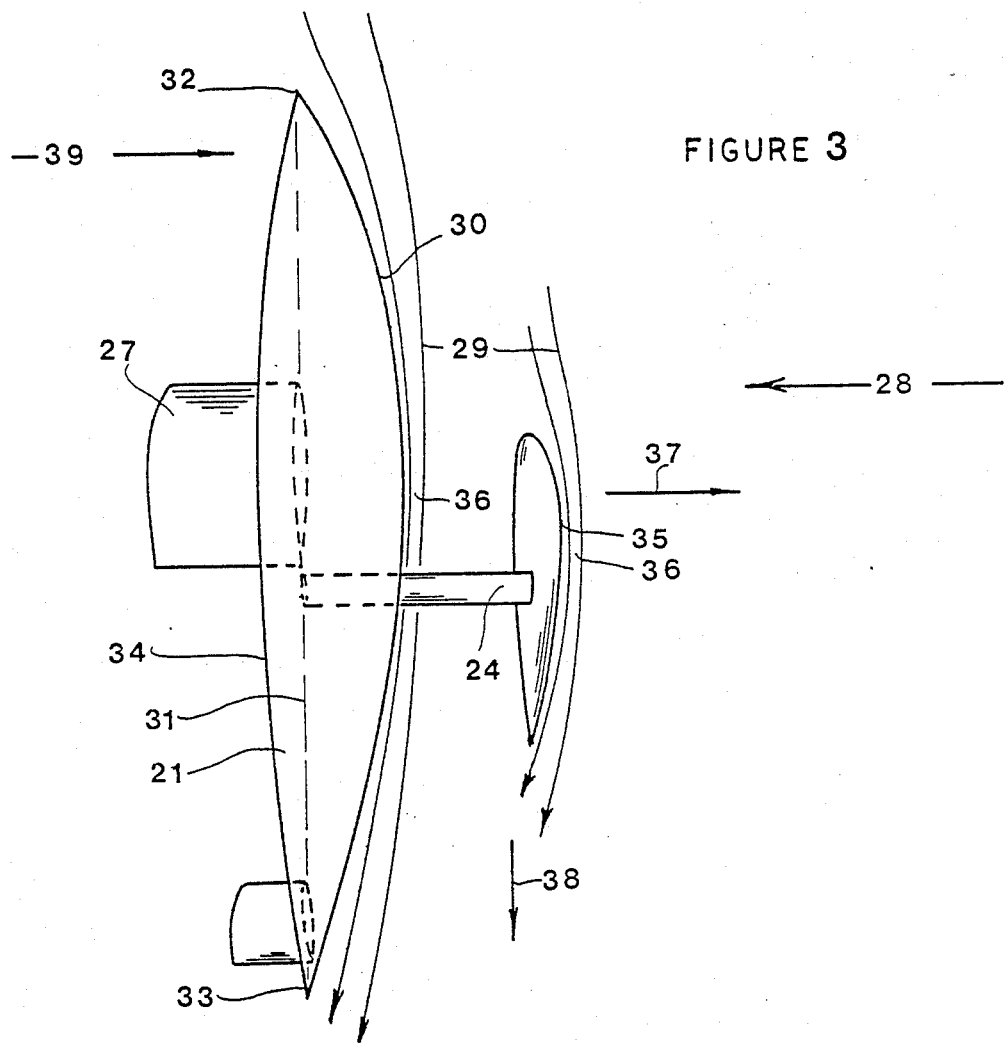
FIG. 3 is a plane view of the submerged part of a sailing craft.

FIG. 3 illustrates schematically the fluid flow pattern of water 29 around hull 21 and its stabilizing system comprising appendages 24 and 27. The body or hull 21 that is here shown sectioned near the water line defines center line 31 that passes through front or leading end or bow 32 and rear or trailing end or stern 33. Anti skid member 27 has a lateral surface substantially parallel to center line 31 so that center board 27 can resist drift or leeward movement of hull 21 induced by the lateral force of wind 28. The windward position of member 24 gives hull 21 windward heel. The windward heel of hull 21 causes it to expose to the water flow 29 the larger and more curved windward side 30 and the smaller and less curved leeward side 34. Tests have shown that the streamlined ballasted member 24 should, in conformity with the flow pattern of the water 29 around hull 21, also have a convex surface portion 35 situated away from hull 21. The positioning of these convex surfaces 30 and 35 to windward results in areas 36 where the passage of hull 21 creates lower dynamic pressure with the resultant dynamic pressure to windward indicated by arrow 37. The arrow 38 indicates the direction of the drag force resulting from the passage of ballasted member 24 through medium 29. The leverage of this drag 38 is partially offset by the lee helm resulting from the propulsion force of wind 28 acting on the windward heeling sail 23. The leverage of any further rudder action required to counter the lee helm will result in a windward yaw of hull 21 indicated by arrow 39. Such windward yaw has the tendency to increase the dynamic pressure 37 and further enhance the windward performance of hull 21. These are some of the beneficial and synergistic effects of windward heel and they are the opposite of the deleterious effect of the conventional leeward heel well-known to those skilled in the art. It is understood of course that the conventional methods to trim a sailing craft by such means as mast or keel repositioning or modification of the sail configuration are additionally applicable. All other embodiments and figures also define center lines such as 31 and have lateral forces such as 28 acting normal to them. The center lines in the following figures have been omitted to preserve illustrative clarity.

Figure 4:
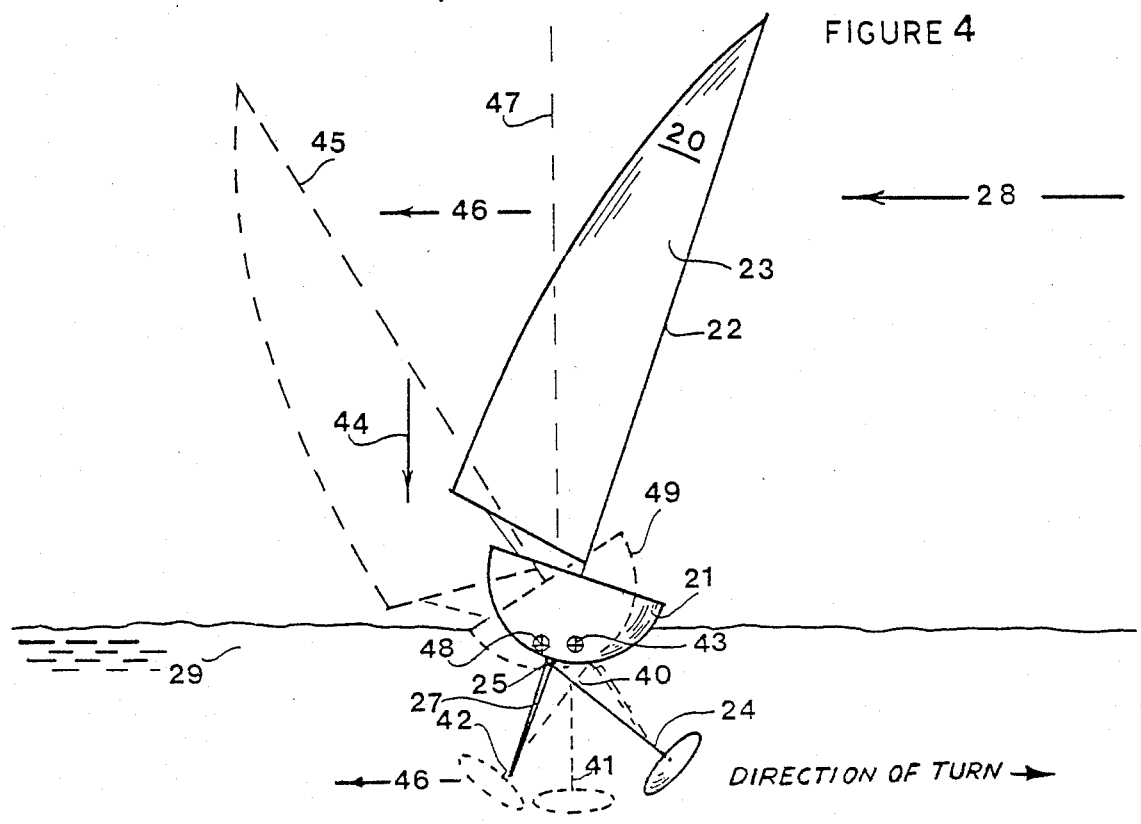
FIG. 4 is a rear view of a sailing craft during a turn.

FIG. 4 shows craft 20 and the actions and forces occurring on its stabilizing system when carrying out the steps of the invented method of causing the ballasted member 24 to be positioned to give windward heel after a course change. Hull 21, mast 22 with mainsail 23, ballasted member 24 and center board 27 are shown in solid lines as when sailing at maximum efficiency prior to a complete course change and heeling toward the lateral force of wind 28. By releasing a locking means (not shown) situated near pivot point 25, the ballasted member 24 will swing by the force of gravity about the point of rotation 40 and will be carried by inertia inherent in its movement past its perpendicular position 41 to point 42. At the same time the suspension point 25 will be moved a small amount about point 40 to windward or toward the center of a turn that could be in progress. The point 40 has been found to be determined by the center of mass of the ballasted member 24 and hull 21 and the center of pressure of the hull 21 and keel 27. Simultaneously the wind 28 acting on sail 23 will rotate the mast 22 substantially about the center of flotation 43 to leeward. Past the line of perpendicular 47 the force of gravity indicated by arrow 44 will bring the mast 22 farther to a leeward heeling position indicated by phantom line 45. The hull now in the position indicated by phantom line 49 defines in the water 29 the new center of buoyancy 48. As static pressure from wind 28 on sail 23 moves mast 22 in its leeward pivoting past the perpendicular 47, the propulsion forces generated by wind 28 on sail 23 will create on hull 21 increasing weather helm favoring the pending completion of the windward turn or tacking. The extent of the leeward heel of the hull 21 now in position 49 is determined at this time by the balance of the forces acting on the mast 22 and the downward pull of ballasted member 24 in position 42. This equilibrium was found to be centered substantially in the new center of flotation 48.

The alternate initial step of the method of releasing the locking means (not shown) prior to the completion of a turn of hull 21 causes the ballasted member 24 and mast 22 to pivot by centrifugal force 46 alone to the outside of a turn independent of the action of wind 28 or gravity 44. The combination of hull 21 and ballasted member 24 is a free floating assembly in the medium of water 29, the ballasted member 24 having a much higher specific weight than water 29 and hull 21. The result is that in a turn the ballasted member 24 is pivoted from perpendicular position 41 to the outside of the turn while the center board 27 is pivoted to the inside of the turn by the long leverage of mast 22 that is pivoted about point 40 to the outside of the turn. This step of the method to use centrifugal forces to change the configuration of the sailing craft 20 can be carried out independently or in conjunction with the action of gravity or wind forces.

At a selected position when the ballasted member 24 and hull 21 are in the required alignment, the locking means at point 25 is engaged, fixing the stabilizing system and the hull 21 with the mast 22 in the configuration outlined in phantom lines. The completion of the turn will change or reverse the exposure of craft 20 to the lateral force or wind 28 which will bring about the mainsail 23 to leeward and the contour of the vessel will again resemble the solid outline only with the position of the bow and stern (not shown) reversed. Tests have shown that the streamlined ballasted member 24 swings approximately 60% past the perpendicular position 41 as measured from its previous position. The dampening effect of water on the lateral movement of the prior art keels with their large lateral surfaces is much more pronounced. The force of the wind on the mast 22 is an important factor in determining the position into which member 24 can be locked with the hull 21. This position 42 also determines at what angle to windward the sail 23 will be positioned in the following tack against wind flow 28. It is evident that the positioning of the ballasted member 24 to windward after the turn is proportional to the force of the wind 28 and/or centrifugal force 46. By controlling the length of action of the described forces namely the wind force 28, gravity 44, inertia and the centrifugal force 46, the crew can modulate or accurately determine in what position member 24 is selectively positioned with respect to hull 21. A further step to carry out the disclosed method is to repeat the maneuver described so as to use the accumulated effect of the centrifugal, gravity and inertia forces acting particularly on ballasted member 24 to bring it into a higher position with respect to hull 21 than on the previous locking or tack, thereby increasing the force available to heel mast 22 windward against the lateral force of the airflow 28. From the consideration of the relationship between the point of suspension 25 for ballasted member 24 and the center of buoyancy 48 it is evident that a reduction of the beam of hull 21 will allow greater leeward heel of mast 22 and hence higher positioning of ballasted member 24. Another source of energy that adds to the speed with which the described turn can be executed is the energy released from the leeward descent of the mast 22 that is converted to angular momentum by the action of the sail 23. The method described uses accordingly six synergistic actions of natural forces that allow the crew to execute a course change and simultaneously change the configuration of sailing craft 20 in order to obtain the benefits of windward heel.

FIG. 5 shows the action of the passing wave 50 on water craft 20 and its stabilizing system as used in the disclosed method. Hull 21 and ballasted member 24 are shown in solid outlines as sailing craft 20 is maneuvered to be temporarily positioned sideways or broadside to wave 50 so that it acts normal to the center line (not shown) of vessel 20. Wave 50 is generated in medium or water 29 in the direction of wind 28. Water particles move near the surface of water 29 as wave 50 passes in the directions indicated by arrows 51, 52, 53 and 54. These arrows describe a rotary motion wherein arrow 51 shows water particles moving forward, arrow 52 indicates their upward movement, arrow 53 shows their downward travel and arrow 54 defines their receding. The hull 21 is moved by the lateral force generated by these water particles to new position 57. The ballasted member 24 is held perpendicular by gravity in the relatively unperturbed deeper water 58 while its suspension point 25 is moved by the wave energy to new position 55. The antiskid member or center board 27 being also in this calmer area 58 of water 29 does not follow in a lateral movement of water particles 51 but pivots substantially about center of pressure 56 near the center of the lateral surface of hull 21 and member 27. When the hull 21 at position 57 has reached a selected position with respect to ballasted member 24, the locking means (shown in later figures) at point 55 will be engaged, fixing hull 21 and ballasted member 24 at the indicated angle. A subsequent turn into the wind or lateral external force 28 will change or reverse the exposure of craft 20 to the external lateral force 28 and will accordingly bring ballasted member 24 to windward where the wind 28 on sail 23 (not shown) can push mast 22 in its direction, lifting member 24.

Obviously the effect of wave energy on water craft 20 is independent of the action of wind 28 on hull 21. The method can accordingly be used on any type of vessel provided it has a ballasted member 24 separate from its antiskid center board 27. A repetition of the described steps of the method can raise ballasted member on hull 21 in successive lock ups of member 24. The initial position would be member 24 in the perpendicular with wind 28 on mast 22 or centrifugal force 46 in a turn or energy from wave 50 providing the first locking or setting of member 24 in a selected position and repetition of the respective maneuvers with member 24 acting as a pendulum achieving higher positions in subsequent lockings or settings.

FIG. 6 shows a front view of stabilizing system 60 seen in perpendicular position and phantom lines suspended from hull 61. The massive ballasted member 62 comprises ballast body 63 suspended from hull 61 in connection with a locking means (not shown) at point 64. The ballast body 63 includes heavy material and has concave surface portion 65 situated toward hull 61 and convex surface portion 66 situated away from hull 61. When seen from above, ballast 63 resembles ballast 24 in FIG. 3. The surface portion 65 is matched in a loose sliding fit to surface portion 65a of the antidrift center board 67 that is suspended near point 64 so as to allow it to bypass member 62 when these two members swing past the perpendicular. The optional endplate 68 has in addition to surface portion 65a a further surface portion 69 that is convex and situated toward the hull 61. The phantom lines 60 illustrate how endplate 68 and ballast body 63 form one streamlined entity when the ballasted member 62 and the antiskid member or keel 67 are are vertically aligned beneath hull 61. This configuration would be chosen by the crew when the sailing craft is on a run downwind or in heavy seas when stability against capsizing is the priority. When carrying out the disclosed method, the streamlined antidrift member 67 is positioned to leeward, the convex surface portions 66 and 69 face to windward 28 and produce their share of windward dynamic pressure in water 29 in a manner explained in connection with FIG. 3. That figure also shows bow the ballasted member 62 and center board 67 can bypass each other in the swing from windward to leeward. The details of the mechanism to achieve this scissor like movement of ballasted member 62 will be illustrated in FIG. 11. Ballasted members 24 and 62 are shown here and in the preceding figures to be pivotably disposed beneath the hulls 21 and 61 by a single streamlined strut made from high tensile steel. To satisfy certain design consideration the ballast can also be suspended by two, three or four similar struts of smaller dimension (not shown) that bypass the keels 27 and 67 fore and aft of their leading and trailing edges.

Figure 7:
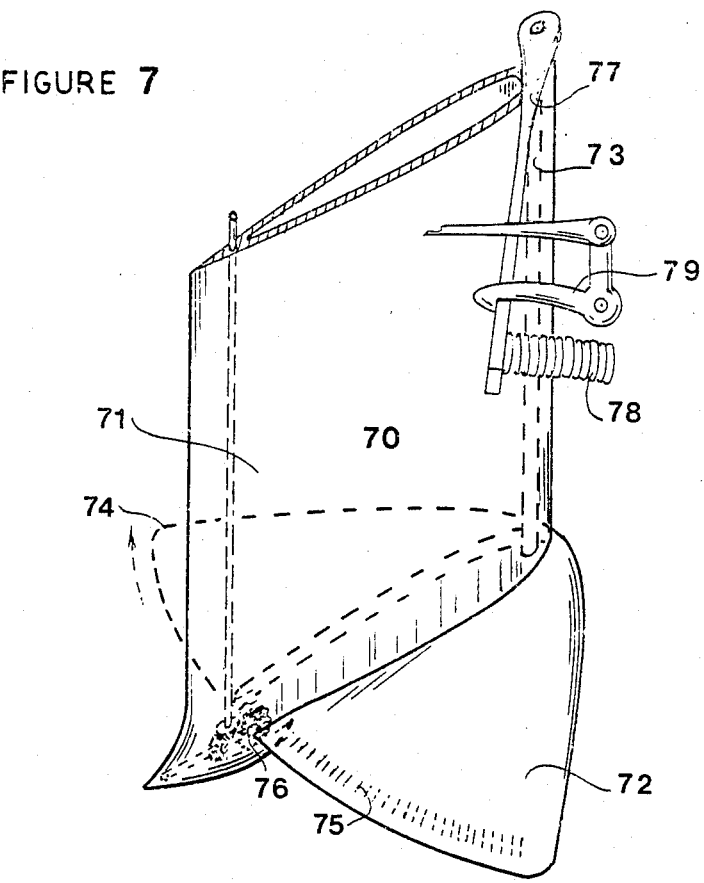
FIG. 7 is a perspective view of a stabilizing assembly according to the present invention.

FIG. 7 shows a perspective view of stabilizing system 70 that is made up of antidrift member 71 and ballasted member 72. Keel or center board 71 has large lateral surfaces to resist the lateral forces of leeward drift whereas ballasted member 72 has a small lateral surface and contains heavy material such as lead. Ballasted member 72 is suspended from a hull (not shown for clarity) by a substantial vertical shaft 73. The range of the lateral pivoting of the ballast 72 is indicated by phantom lines 74. A series of teeth or a rack 75 on the lower side of streamlined member 72 defines a segment of a circle with the center at the shaft 73. The pinion 76 engages rack 75 and supports part of the weight of ballasted member 72. Linkage to the hull controls the rotation of pinion 76 and thereby the lateral swing of ballasted member 72. An alternate and optional stopping means or locking means to arrest ballasted member 72 is the lever 77 and releasable catch 79. Lever 77 is securely fastened to shaft 73 and catch 79 is securely disposed in the hull. The coil spring 78 is part of the energy storing power assistance means. Spring 78 is compressed by kinetic energy from lever 77 at the end of its stroke, and is converted to storable energy in the form of retained tension. On demand this stored energy can be released as kinetic energy and initiate the return of lever 77 and the lateral swing of ballasted member 72. In this embodiment where the ballasted member 72 is movingly suspended about a vertical axis 73, the point at which maximum kinetic energy is available from the ballast is at the end of its lateral travel. It is accordingly appropriate to locate the energy storing means at the point where this occurs, as shown. In the embodiments where the ballasted member swings about a horizontal axis as in FIGS. 2-5, the point of maximum kinetic energy present in the ballasted member occurs when it swings past the perpendicular and in the respective embodiments the energy storing means should be located at that point and accordingly adapted. The spring 78 will assist member 72 to swing toward position 74 when the locking means or catch 79 releases lever 77. The spring 78 will not only convert kinetic energy to storable energy but also serve as a means to cushion the force of the swing of lever 77 against the hull.

The method of using centrifugal force to swing member 72 to the outside of a turn is another aid to initiate the lateral pivoting of ballasted member 72.

Figure 8:
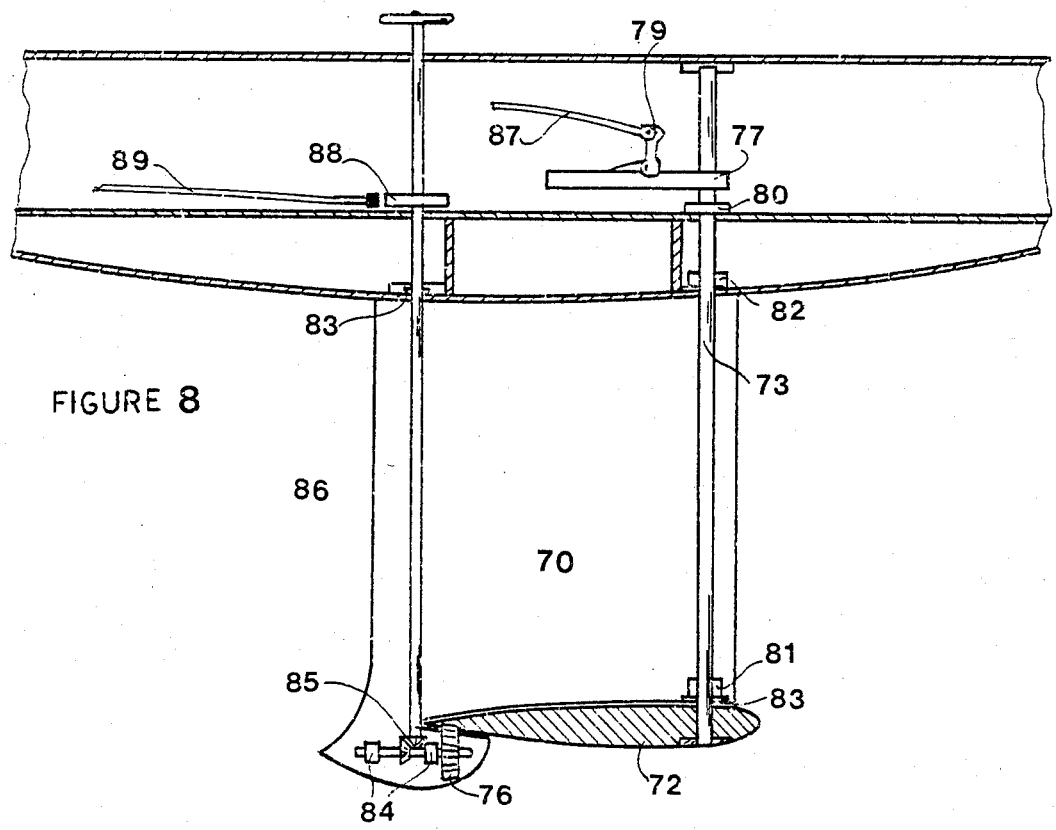
FIG. 8 is a side view of the same stabilizing assembly.

FIG. 8 illustrates diagrammatically a sideview of the stabilizing system 70. A thrust bearing 80 carries the weight of member 72 that is suspended by shaft 73. Bearings 81 and 82 in antidrift member 71 and the hull respectively take lateral loads as shaft 73 rotates with the lateral swing of ballasted member 72. Gaskets or packings 83 make the entry of shaft 73 into the hull watertight. The bearings 84 located in member 71 support the shaft-carrying pinion 76 that support the trailing edge of streamlined member 72. Bevel gears 85 transfer rotation from pinion 76 via the shaft 86 into the hull where brake 88 and other equipment allows control of rotation. Ring gasket 83 seals the hull with shaft 86. Lines 87 and 89 connect locking means 79 and brake 88 respectively to the cockpit or bridge area (not shown) where the crew would control their function. To comply with the rules for the construction of some classes of racing hulls all of these controls can be located below the water line of the hull. An alternate construction (not illustrated) of the locking means using shaft 86 and pinion 76 for use in smaller craft is to make the pinion 76 a freely rotating wheel and make shaft 86 and bearings 84 an integral unit that can be lifted upward a small distance by appropriate leverage to lock ballasted member 72 with antidrift member 71 by friction at the trailing edge. The ballasted member 72 forms an effective water flow barrier to the tip vortice that would form on antidrift member or keel 71. This member, constructed from the same material as the hull, aluminum or reinforced fiberglass for example, and being on the average ten times longer than thick as measured at the chord, would be approximately forty times lighter per unit of lateral surface area than the ballasted member 72 which could, except for its structural parts, be constructed of lead. The mass load per unit of lateral area of the ballasted member 72 is accordingly about forty times the lateral surface to weight ratio of the antiskid keel or center board 71. The other embodiments of the present invention have comparable ratios. Even when using other conventional materials such as concrete ballast, the small and streamlined lateral surfaces of the ballasted members 24, 62 or 72 allow for fast and wide swing of these ballasted members despite the resistance of the water. By contrast the keels of the prior art such as the Sudgen double keel have only one quarter or less lateral surface to mass ratio of the ballast of the present invention because the prior art keels combine a large lateral surface with their ballast functions.

Figure 9:
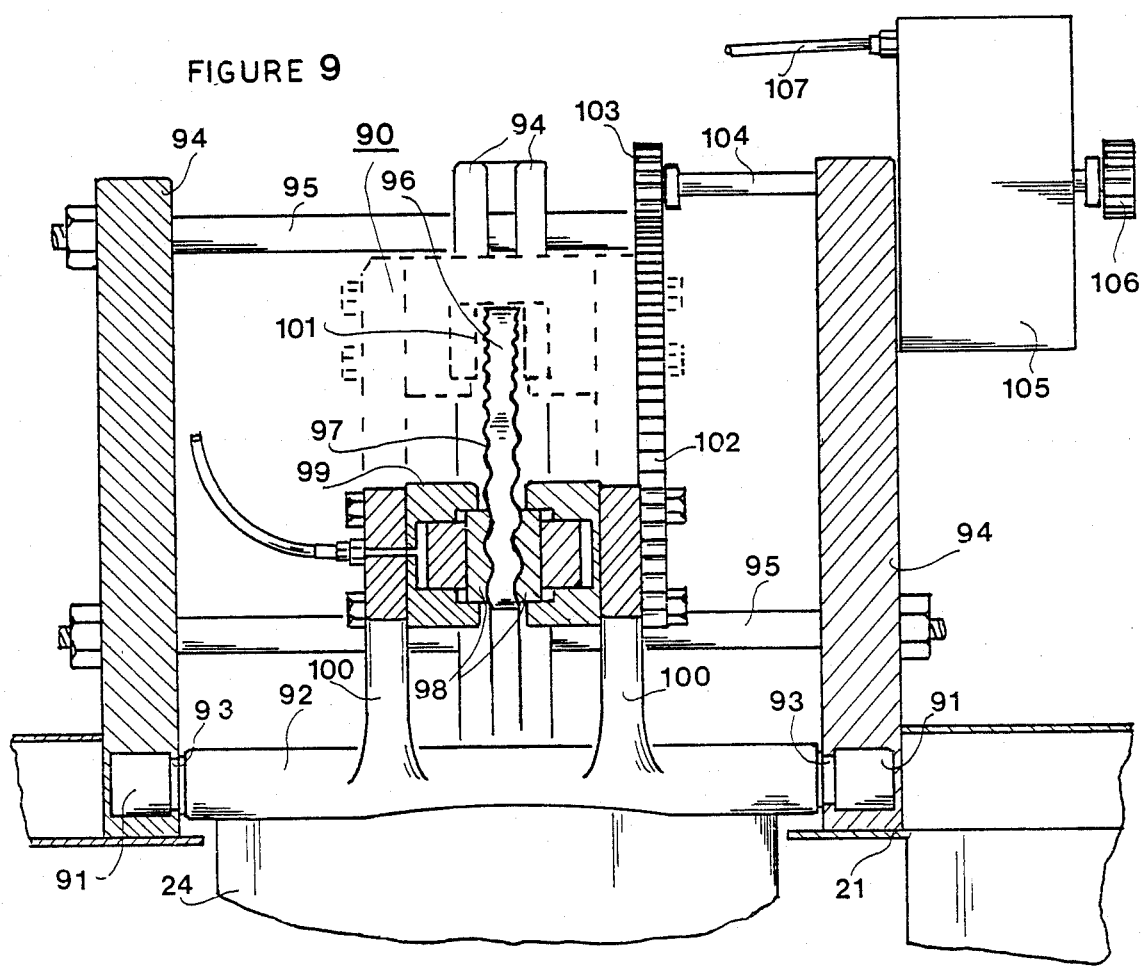
FIG. 9 is a partially sectioned view of a locking means of the present invention.

FIG. 9 shows a partially sectioned side view of locking means 90 of a stabilizing system for pivoting ballasted members such as 24 or 72 of the present invention. Bearings 91 are the means by which axis 92 is suspended from hull 21. Gaskets or watertight bushings 93 contribute to seal the shaft 92 with the interior of hull 21. Strong beamwise plates 94 are held by bolts 95 in alignment and connected to suitably stressed bulkheads (not shown) of hull 21. The inner plates 94 carry a central member 96 shaped like a segment of a circle with its center on axis 92. Segment 96 carries radially disposed serrations 97 engaging matching serrations in pressure pads 98 of hydraulic disk brake assembly 99. The locking assembly 99 is securely bolted to levers 100 that are integral with, or attached to shaft 92 and the ballasted member 24. The serrations 97 of the segment 96 and pads 98 have a suitable depth and slope to aid disengagement when ballasted member 24 is released under considerable pressure from a selected windward and raised position as illustrated in FIGS. 2, 3, 4 or 6. For larger sailing craft this non binding and self disengaging sloped locking mechanism is of crucial importance since the large forces involved cause binding and wear and would make the locking means 90 unmanageable. The brake assembly 99 is shown with pads 98 in the opened or released position by phantom lines 101. Pads 98 and segment 96 will be made from a suitable material and have hardened surfaces to withstand the loads when clamping member 24 in its selected positions. During the step of the method of closing the locking means 90 to fix member 24 in a selected position with hull 21, little lateral pressure may be exerted on serrations 97, since the ballasted member may be at a standstill at the apogee of its swing and hull 21 might have reached a standstill in its leeward heel. An optional section of spur gear 102 is bolted to levers 100 and drives sprocket 103 during the swing of ballasted member 24. Shaft 104 carries or drives pump or compressor 105 and optional secondary sprocket 106 that can be used as a power take off or means to move levers 100. Pump 105 is connected t a reservoir (not shown) by line 107 and can serve the energy storing means to provide auxiliary power to a servo mechanism for brake assembly 99. Of course the restrained driver position of the driver in a motor car does not apply to the crew of a sailing vessel and the brake assembly 99 could be activated by a powerful lever or screw jack driven by a hand wheel substituting for the power assist. Details of the power assisted brake system are conventional and well known to those skilled in the art and have been omitted to maintain clarity of the illustrations.

The described locking means 90 is but one of the ways to provide positive arresting of the first ballasted streamlined member 24 and hull 21. On a model yacht for example a simple radially grooved and hinged member linked to a servo would be sufficient for the task. On a large racing hull, those skilled in the art are able to custom engineer other locking means that suit the stresses encountered on any particular design. An obvious advantage is to use off-the-shelf components as shown in locking means 90. This kind of stopping means is also suitable to be used with the lever 77 of the stabilizing system 70 of FIGS. 7 and 8. The assembly 90 would be installed vertically rather than horizontally and levers 100 would replace lever 77 and the catch 79 would be redundant. Suitable linkage connects the elements of locking assembly 90 to the crew stations so they can initiate the various steps of the method disclosed.

Figure 10:
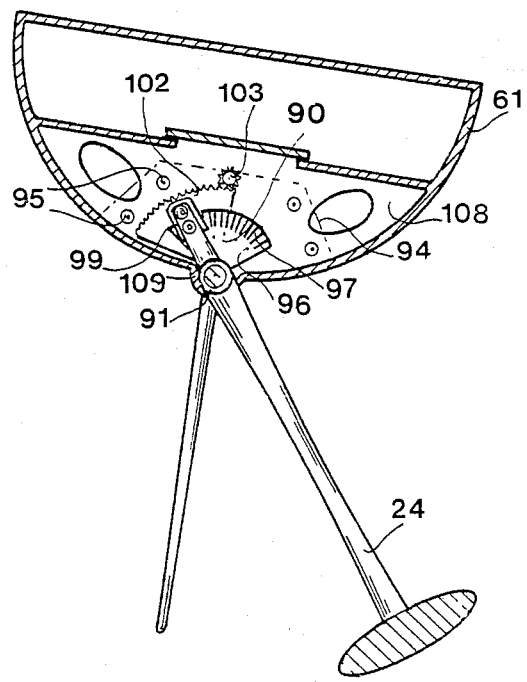
FIG. 10 is a sectioned rear view of the same locking means.

FIG. 10 shows the locking or stopping means 90 of a stabilizing system in the partially beamwise sectioned hull 21. The ballasted member 24 is shown swung to wind ward as in FIG. 2. The brake assembly 99 has swept to the leeward side of the segment 96 and locked on the radial serrations 97. Bolts 95 are shown in their position as they connect plates 94 and bulkhead 108. The segment of spur gear 102 engages sprocket 103. The bearings 91 are substantially located in a streamlined protrusion or "bustle" 109 of hull 21 to allow a wide swing of member 24 without creating a slot against the hull 21 that generates undesirable turbulence. If a wider swing of ballasted member 24 of the stabilizing system is required, the driving of the sprocket 103 has to be designed with arrangements other than the spur gear segment 102. A suitable alternative might be a chain and pulley drive (not shown).

Figure 11:
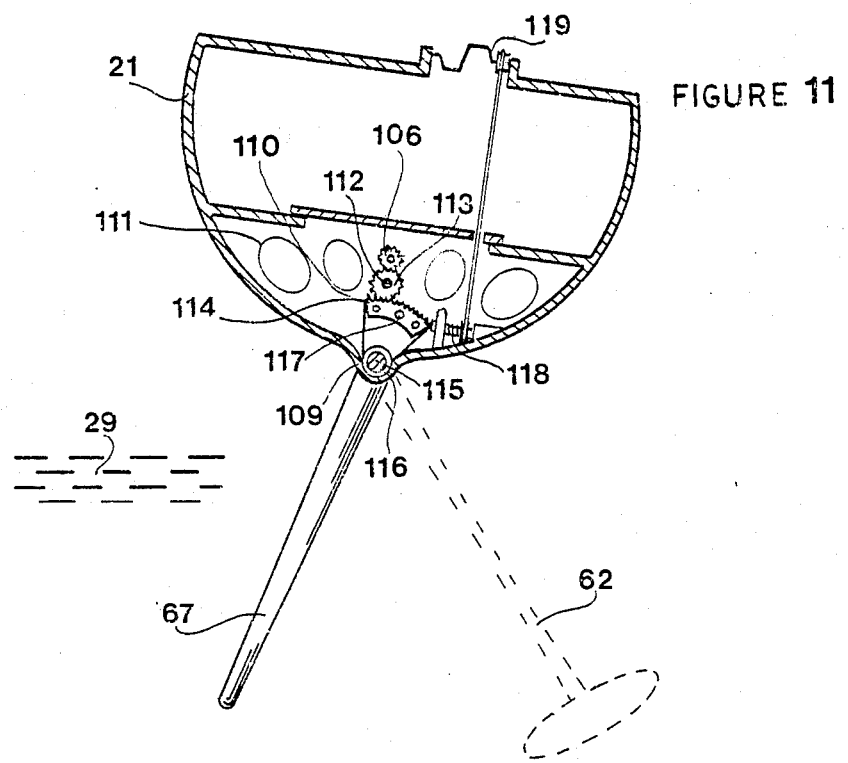
FIG. 11 is a schematic representation of a connecting linkage in a stabilizing system.

FIG. 11 illustrates diagrammatically connecting means 110 that is adapted to drive or swing the antidrift center board 67 of a stabilizing system as shown in FIG. 6. Hull 61 is sectioned beamwise and exposes bulkhead 111 that seats shaft 112 of sprocket 113. This gear 113 serves to change the direction and ratio of the rotation of sprocket gear 106 that is driven by the energy from the movement of ballasted members 62 or 24 (shown in phantom lines). This action is detailed in FIG. 10. A segment of a spur gear 114 is engaging sprocket 113 and is properly fixed to shaft 115 that carries the pivotable center board or keel 67 in bearings 116. A streamlined housing 109 provides for smooth flow of medium or water 29. To change the angle of inclination between the members 62 and 67, various matching sets of sprocket gears 103, 113 and segment 114 can be installed on shafts 115 and 112 respectively. Bolts 117 are provided to change the distance of segment 114 to shaft 112 so as to compensate for various sizes of sprockets 106, 113 and segment 114. During trials of hull 21 the ratio of the reciprocating movement of members 62 and 67 can be finely tuned. The method of moving the center board 67 opposingly to the movement of ballasted member 62 by using the energy from the swing of member 62 can be practiced in this way. If desired, the hull 21 can thus be sailed in a more upright position yet still give leeward inclination to antidrift center board 67. This connecting means 110 will be applicable whether member 67 has the optional endplate 68 or not. Other embodiments of connecting means 110 are possible such as a connecting lever or a chain and sprocket drive (not shown). An adjustable abutment means 118 is a screw jack driven by winch 119 that serves to preselect the inclination of pivotable center board 67. An indicator (not shown) could be mounted deckside and give the crew indication of the status of the position of either or both members 24 and 67. A separate abutment means could be provided for ballasted members 24 or 62.

Figure 12:
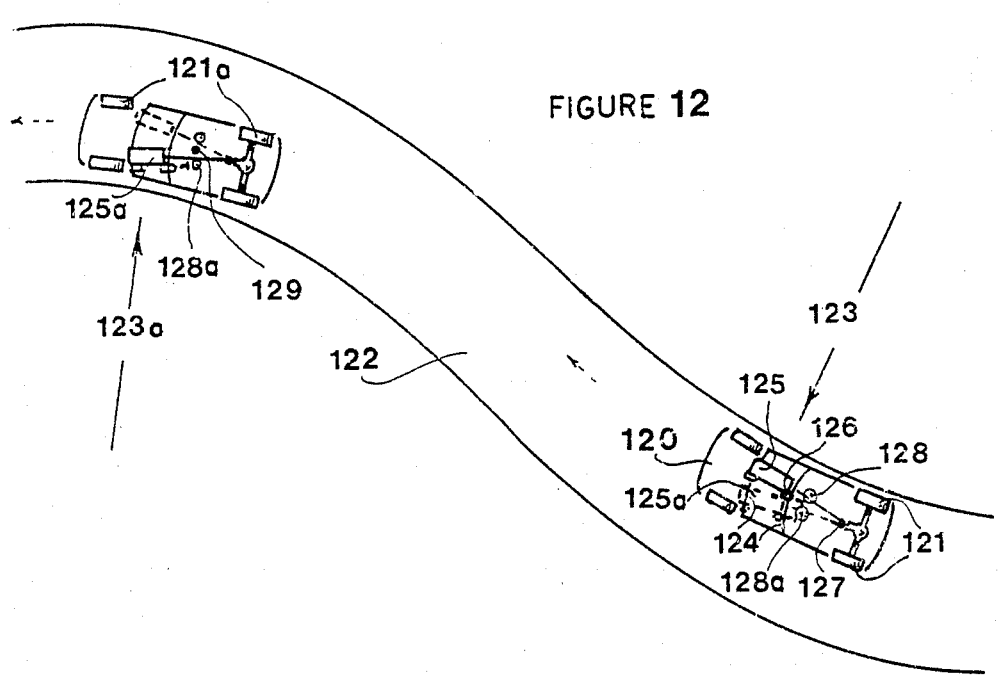
FIG. 12 is a top view of a land vehicle.

FIG. 12 shows diagrammatically a land vehicle or racing car 120 with a stabilizing system and having wheels with tires 121 that are in contact with medium or road surface 122. Tires 121 transfer lateral centrifugal force 123 resulting from driving a turn with vehicle 120 on medium 122 and serve accordingly as antiskid or antidrift members and steering means. Part of the chassis or body of car 120 are guide rails 124 that permit the relatively heavy propulsion unit or motor 125 to move laterally by the use of the centrifugal force 123. A locking means 126 similar in function to unit 100 of FIG. 10 permits to temporarily fix the motor or ballasted member 125 in selected positions in relation to car 120. The conventional universal joint 127 compensates for the lateral swing of ballasted member 125 during power transfer to wheels 121. The lateral movement of motor unit 125 allows the step of the method to shift the location of the center of gravity from the center of vehicle 120 to positions 128 or 128a respectively. The lateral movement of ballasted member 125 would be triggered by the release of locking means 126 during the final phase of a turn that is the predecessor of a further turn in the opposite direction. Once the ballasted member 125 has been moved by the centrifugal force 123 to the outside of the turn and locked by locking means 126 in the outside position 125a, the reverse of the turn of the car 120 will change its exposure to the external lateral force 123 and will position motor unit 125 toward the inside of the further turn. The centrifugal force 123a of the further turn would put greater loads on tires 121a on the outside of a turn in the case of a prior art vehicle. The inside position 125a of ballasted member 125 during this following turn will shift the center of mass to position 128a, resulting in the center of all forces 129 to be centered on car 120 and the load on all tires to be more even, giving better turning, braking and acceleration performance.

Figure 13:
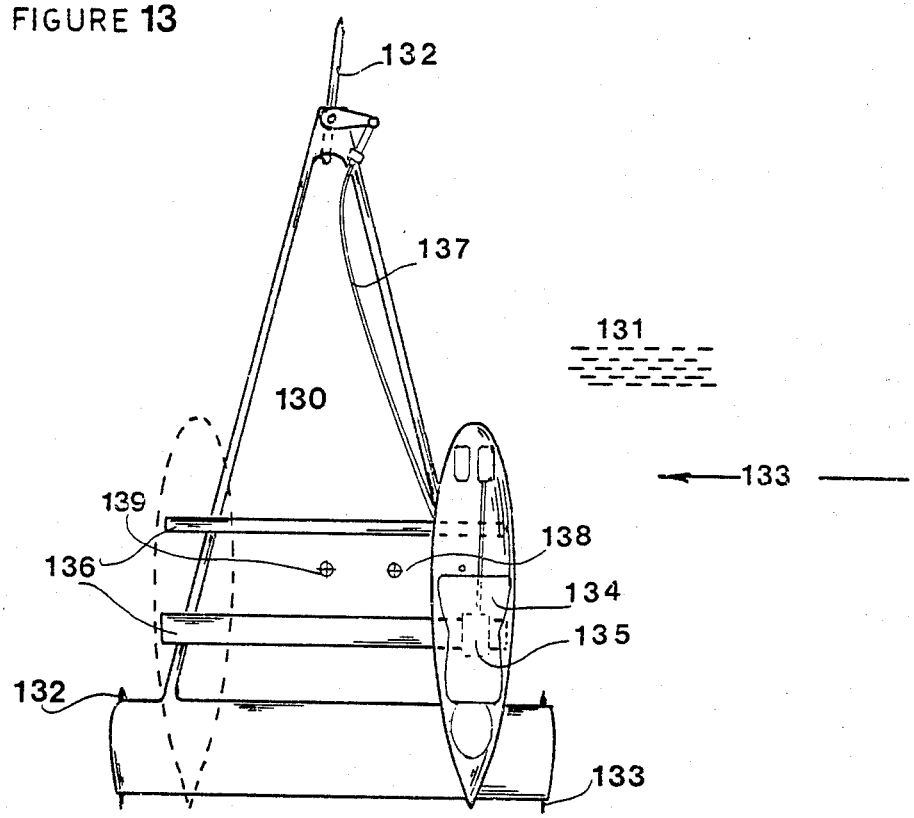
FIG. 13 is a top view of an ice vehicle.

FIG. 13 gives a diagrammatical top view of ice craft 130 with a stabilizing system touching medium or ice surface 131 with runners 132. Lateral force 133 could be the result of centrifugal forces in a turn or of wind 28 on an ice or land sailer. The runner 133 would be lightly loaded and the ice craft 130 subject to tilting or to roll over were it not for crew seat or accommodation or capsule 134 that is held by locking means 135 on its guide tracks 136. Guide tracks 136 are part of the body or frame of ice craft 130. The crew seat is the ballasted member 134 with the crew providing mass to make this weight shifting stabilizing system more effective. The steering means or runner 132 is connected to crew capsule 134 by a suitable connection such as a hydraulic line 137 that compensates for the variation in distance between runner 132 and seat 134. The benefits of this weight-shifting stabilizing system is similar to the previously discussed embodiments in that it combines the advantages that accrue to a sailing vessel with the ones inherent in the motorcar illustrated in FIG. 12. Ballasted member 134 being selectively positioned on vehicle 130 toward external force 133 results in the position 138 for the center of mass of the ice craft. The effect of the lateral force 133 causes the center of all forces on vehicle 130 to shift to position 139, giving the beneficial result of even loads on runners 132 and 133. Additionally fluctuations in the strength of force 133 are less likely to roll or topple ice craft 130.

The invented method and apparatus shall be considered to be defined by the following claims. Accordingly I claim:

1. In a vehicle adapted to move in touch with a medium, said vehicle having a body with a front end or leading end and a rear end or trailing end, said body defining a center line passing through said front end and said rear end, said vehicle exposable to external forces acting substantially normal to said center line, said vehicle having steering means and at least one antiskid member or antidrift member disposed on said body aligned substantially parallel with said center line and adapted to be in touch with said medium and to resist movement of said vehicle in the direction of said external lateral forces by contact with said medium, the improvement comprising: a separate stabilizing system to resist rolling or heeling forces acting on said vehicle, said stabilizing system comprising weight shifting means and consisting of:

(a) at least one ballasted member having a higher specific weight than water and being distinct from said antiskid member and having more mass than said antiskid member, said ballasted member adapted and disposed on said vehicle to be laterally movable with respect to said center line solely by at least one of said external lateral forces and (b) a releasable stopping means or locking means adapted to hold or connect said ballasted member in selected positions with respect to said body.

2. In a vehicle as defined in claim 1 wherein said vehicle is a sailing vessel and medium is water, said body is a hull with a bow and stern, said steering means is a rudder and said antidrift member is a center board or keel and wherein said ballasted member is streamlined and adapted to bypass said center board when moved laterally with respect to said center line.

3. In a vehicle as defined in claim 2 wherein said keel or center board is pivotably disposed beneath said hull and linked by suitable connecting means with said ballasted member, said connecting means adapted to move said center board laterally in a selected ratio and in the opposite direction of the movement of said ballasted member with respect to said center line.

4. In a vehicle as defined in claim 3 wherein said ballasted member comprises a ballast body with a convex surface portion situated away from said hull and a concave surface portion situated toward said hull and wherein said center board has an endplate with a substantially convex surface portion situated toward said hull, said ballast body and said endplate forming a streamlined entity when aligned together beneath said hull and said ballast body exposing its convex surface portion to windward when said ballasted member is swung to windward with respect to said hull and said endplate exposing its convex surface portion also to windward when said center board is swung to leeward with respect to said hull.

5. In a vehicle as defined in claim 2 wherein said ballasted member is pivotingly disposed about a substantially vertical axis of rotation.

6. In a vehicle as defined in claim 1 wherein said stabilizing system comprises an energy storing power assistance means adapted to facilitate the movement of said ballasted member with respect to said center line, said assistance means adapted to receive and release energy derived from the lateral movement of said ballasted member with respect to said body.

7. In a vehicle as defined in claim 1 wherein said stabilizing system comprises an energy storing power assistance means adapted to facilitate the movement of said locking means with respect to said body, said assistance means adapted to receive and release energy derived from the lateral movement of said ballasted member with respect to said body.

8. In a vehicle as defined in claim 1 wherein said vehicle is a land vehicle and said medium is a surface and said antiskid member is at least one tire and wherein said ballasted member comprises the propulsion unit of said vehicle.

9. In a vehicle as defined in claim 1 wherein said vehicle is an ice craft propelled by natural forces and said medium is an ice surface and wherein said ballasted member comprises the seat or accommodation for the crew and wherein said mass includes said crew and said antiskid member is a runner of said ice vehicle.

10. A method to provide antiroll forces or antiheeling forces on a vehicle, said method using forces originating in the environment surrounding said vehicle, said vehicle adapted to move in touch with a medium, said vehicle having a body with a front end or leading end and a rear end or trailing end, said body defining a center line passing through said front end and said rear end, said vehicle adapted to change its exposure to external lateral forces having a component acting normal to said center line, said vehicle having steering means and at least one antidrift member or antiskid member disposed on said body aligned substantially parallel with said center line and adapted to be in touch with said medium and to resist movement or skid of said vehicle in the direction of said external lateral forces by contact with said medium, said vehicle having a separate stabilizing system adapted to resist roll forces or heeling forces induced on said vehicle, said stabilizing system consisting of at least one ballasted member having a greater mass than said antiskid member, said ballasted member disposed on said vehicle to be laterally movable with respect to said center line, said stabilizing system having a releasable stopping or locking means to hold said ballasted member in selected positions with respect to said body, said method comprising the steps of:

(a) maneuvering said vehicle by use of said steering means so as to be causing said vehicle to be acted on by one of said external forces having a component substantially normal to said center line and acting in a selected direction, (b) releasing said locking means, thereby causing one of said external forces to move said ballasted member with respect to said body to a selected position with respect to said body or causing one of said external forces to change the position of said body with respect to said ballasted member, (c) locking said ballasted member by use of said locking means, thereby causing said ballasted member to be temporarily fixed in a selected position with respect to said body, (d) changing the exposure of said vehicle to said lateral forces in such a manner as to be causing said ballasted member to be positioned to the side of said center line that faces the direction from which one of said lateral forces is acting on said vehicle, thereby causing said ballasted member to provide antiroll forces or antiheeling forces on said vehicle or to diminish the effect of roll forces or heeling forces acting on said vehicle.

11. A method as defined in claim 10 wherein said vehicle is a sailing craft and wherein said body is a hull with a bow, stern, mast and sail and wherein said steering means is a rudder and wherein said antidrift member is a keel or center board and wherein said medium is water and wherein said ballasted member is streamlined and adapted to bypass said center board when moved laterally with respect to said center line, and wherein one of said external forces is derived from wind energy acting to leeward on said sail and wherein said method comprises the steps of causing said wind energy to heel said mast and hull to leeward while the force of gravity holds said ballasted member substantially perpendicular beneath said hull and turning said sailing craft until said ballasted member is on the windward side of said hull, thereby causing said sailing craft to sail with said mast inclined to windward or to sail with said mast less inclined to leeward and causing said sailing craft to sail with said center board inclined to leeward or to sail with said center board less inclined to windward, thereby (e) causing said hull to expose against the water a large and more curved area on the windward side and less curved area on the leeward side thereby generating on said sailing craft dynamic pressure to windward or less dynamic pressure to leeward, (f) causing said wind energy to induce on the windward side of said sail a spanwise air flow component directed toward said hull or to impede a spanwise air flow component on the windward side of said sail away from said hull, thereby reducing spill of wind from said sail and reducing the induced drag on said sailing craft in the air, (g) causing to be induced on the leeward side of said center board a spanwise water flow component toward said hull or causing to impede on the leeward side of said center board a spanwise water flow component away from said hull, thereby reducing the tip vortex at said center board and reducing the induced drag on said sailing craft in the water and (h) causing on said sailing craft the beneficial effects of lee helm or causing on said sailing craft the reduction of the deleterious effects of weather helm.

12. A method as defined in claim 11 wherein said method comprises the further step of releasing said ballasted member from the selected position in which it was temporarily fixed respect to said body or hull and to which said external lateral force had lifted said ballasted member after the step of changing the exposure of said vehicle or sailing craft to said external lateral force, thereby causing said ballasted member to swing propelled by the force of gravity laterally to said center line past the perpendicular and move by inertia to a higher selected position with respect to said hull than the selected position during the previous releasing of said locking means and wherein said method comprises the further step of fixing said ballasted member in said higher selected position with respect to said hull by locking said locking means.

13. A method as defined in claim 11 wherein said center board is laterally pivotally disposed beneath said hull and linked by suitable connecting means with said ballasted member, said connecting means adapted to move said center board laterally in a selected ratio and in the opposite direction of the move of said ballasted member and wherein said method comprises the additional step of causing said center board to be laterally moved in a selected ratio in the opposite direction of said ballasted member by use of kinetic energy transferred from said ballasted member to said center board by said connecting means.

14. A method as defined in claim 10 wherein said vehicle is a water craft and wherein said body is a hull with a bow and stern and wherein said antidrift member is a keel or center board and wherein said medium is water and wherein said ballasted member is adapted to bypass said keel when moved laterally with respect to said center line and wherein one of said external forces is derived from wave energy and wherein said method comprises the step of maneuvering said water craft until said wave energy is generating a force component acting substantially normal to said center line.

15. A method as defined in claim 10 wherein one of said external forces acting substantially normal to said center line is a centrifugal force and wherein said method comprises the step of inducing said centrifugal force on said vehicle by moving said vehicle in the direction of said center line and in a turn in said environment.

16. A method as defined in claim 15 wherein said vehicle is a water craft, said body is a hull with a bow and stern, said medium is water and wherein said antidrift member is a keel or center board disposed beneath said hull and wherein said ballasted member is streamlined and adapted to bypass said center board when said ballasted member is moved laterally with respect to said center line and wherein said method comprises the step of pivoting said ballasted member laterally away from said center board.

17. A method as defined in claim 15 wherein said vehicle is a land vehicle and wherein said medium is a surface and said antiskid member is one tire of several tires and wherein said ballasted member comprises the propulsion means of said vehicle and wherein said method comprises the step of moving said propulsion means by use of said centrifugal force laterally with respect to said center line and thereby causing the weight of said vehicle to be distributed more evenly on said tires in a further or subsequent turn in the opposite direction of said turn.

18. A method as defined in claim 15 wherein said vehicle is an ice craft propelled by natural forces and said medium is an ice surface and wherein said ballasted member comprises the seat or accommodation of the crew of said vehicle and wherein said mass includes said crew and wherein said antiskid member is one runner of several runners and wherein said method comprises the step of moving said accommodation and said crew by use of said centrifugal force, thereby causing the weight of said vehicle and crew to be more evenly distributed between the said several runners during a further turn by said ice vehicle in the opposite direction of said turn.

19. A method as defined in claim 10 wherein said stabilizing system comprises an energy storing power assistance means adapted to facilitate the movement of said ballasted member with respect to said center line, said assistance means adapted to receive and release energy derived from the lateral movement of said ballasted member with respect to said body and wherein said method comprises the steps of taking said energy from said ballasted member, converting said energy to storable energy and storing said storable energy in said energy storing power assistance means and at a selected time releasing said storable energy, converting said storable energy to kinetic energy and facilitating the movement of said ballasted member.

20. A method as defined in claim 10 wherein said stabilizing system comprises an energy storing power assistance means adapted to facilitate the movement of said locking means with respect to said body, said assistance means adapted to receive energy derived from the lateral movement of said ballasted member with respect to said body, said method comprising the steps of: taking said energy from said ballasted member, converting said energy to storable energy and storing said storable energy in said energy storing power assistance means and at a selected time releasing said storable energy, converting said storable energy to kinetic energy and facilitating the movement of said locking means with respect to said body.

* * * * *